US008045928B2

(12) United States Patent
Peng

(10) Patent No.: US 8,045,928 B2
(45) **Date of Patent: *Oct. 25, 2011**

(54) TEST SYSTEM FOR ADJUSTING A WIRELESS COMMUNICATION DEVICE BY IMPEDANCE LOADING FEATURES

(75) Inventor: Chen-Shu Peng, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 620 days.

This patent is subject to a terminal disclaimer.

(21) Appl. No.: 12/234,706

(22) Filed: Sep. 21, 2008

(65) Prior Publication Data

US 2009/0179807 A1 Jul. 16, 2009

(30) Foreign Application Priority Data

Jan. 10, 2008 (TW) ............................... 97101002 A

(51) Int. Cl.
*H04B 17/00* (2006.01)

(52) U.S. Cl. ............... 455/67.14; 455/67.11; 455/67.16; 455/115.1; 455/226.1

(58) Field of Classification Search ............... 455/67.11, 455/67.14, 67.16, 115.1, 115.2, 226.1
See application file for complete search history.

(56) References Cited

U.S. PATENT DOCUMENTS

| | | | | |
|---|---|---|---|---|
| 2006/0082378 | A1 * | 4/2006 | Majerus et al. | 324/754 |
| 2008/0205173 | A1 * | 8/2008 | Kliewer et al. | 365/201 |
| 2008/0252028 | A1 * | 10/2008 | Huang | 280/47.41 |
| 2009/0146891 | A1 * | 6/2009 | Chen | 343/745 |

* cited by examiner

*Primary Examiner* — Tuan Pham
(74) *Attorney, Agent, or Firm* — Winston Hsu; Scott Margo

(57) ABSTRACT

A test system for adjusting a wireless communication device by impedance loading features includes a power supply for generating a plurality of voltages, a test fixture coupled to the power supply for generating impedances corresponding to a plurality of impedance loading areas, a test equipment coupled to a test point of the wireless communication device via the test fixture for measuring a plurality of radio frequency characteristic sets of the wireless communication device, and a decision device coupled to the test equipment for determining an optimal impedance loading area of the wireless communication device according to the plurality of radio-frequency characteristic sets.

16 Claims, 6 Drawing Sheets

TEST SYSTEM FOR ADJUSTING A WIRELESS COMMUNICATION DEVICE BY IMPEDANCE LOADING FEATURES

BACKGROUND OF THE INVENTION

1. Field of the Invention

The present invention relates to a test system for adjusting a wireless communication device by impedance loading features, and more particularly, to a test system for reducing time and resources for designing the wireless communication device.

2. Description of the Prior Art

RF (radio-frequency) performance of a wireless communication device determines the communication quality of the wireless communication system. If transmission power of the wireless communication device is not well designed, reception quality of a corresponding base station will be affected. On the other hand, if reception sensitivity of the wireless communication device is not well designed, reception efficiency of the wireless communication device will be affected. In other words, once a defect appears in either Uplink or Downlink, the overall communication quality will be greatly influenced, which may lead to disconnection. Therefore, when designing a wireless communication device, the designer must consider transmitting and receiving performance of an RF circuit in the wireless communication device, in order to achieve the required communication quality.

Please refer to FIG. 1. FIG. 1 is a schematic diagram of an RF circuit 10 of a wireless communication device in the prior art. The RF circuit 10 comprises an RF transmitting module 12, an RF receiving module 14, an antenna switching module 16, an antenna 18, and an antenna matching circuit 20. The RF transmitting module 12 comprises a power amplifier 120 and a matching circuit 122, and is utilized for enhancing power of signals outputted from an RF signal processing unit, so as to emit the signals via the antenna 18. The RF receiving module 14 comprises a low noise amplifier 140, a matching circuit 144, and a surface acoustic wave (SAW) filter 146, and is utilized for receiving wireless signals via the antenna 18, and transmitting the received signal to the RF signal processing unit for performing demodulation, decoding, etc. Generally, when designing the RF circuit 10, a test point TP, taken as a boundary, is connected to a test device with 50Ω impedance to adjust characteristics of the RF transmitting module 12 and the RF receiving module 14 according to a design specification. Then, the antenna 18 is installed in the RF circuit 10, and a network analyzer is utilized for measuring the antenna 18 via the test point TP, so as to adjust a shape of the antenna 18 and the characteristics of the antenna matching circuit 20 to reach an optimal standing wave ratio or reflection coefficient.

After the design of the RF circuit 10 is complete, a wireless communication device installed with the RF circuit 10 is placed in the three-dimensional microwave anechoic chamber for testing total radiation power (TRP) and total isotropic sensitivity (TIS), as shown in FIG. 2. TRP and TIS are used to evaluate the transmitting and receiving abilities of the wireless communication device, and related illustration is as follows.

TRP is the average value of outwardly radiated power of a transmitter in the wireless communication device in omni directional space, which overall estimates the transmitting ability of the transmitter in the three-dimensional space. The testing method of TRP is: set up the wireless communication device to the three-dimensional microwave anechoic chamber as shown in FIG. 2, estimate the effective isotropic radiated power (EIRP) respectively at each 15 degrees interval between the θ-axis and ϕ-axis on a spherical coordinate system by controlling the location of the wireless communication device, and by carrying out the integral operation on all estimated results, TRP therefore can be obtained. On the other hand, TIS is the receiving sensitivity of the receiver in the wireless communication device in omni directional space, which overall estimates the receiving ability of the receiver in the wireless communication device. The testing method of TIS is: estimate the effective isotropic sensitivity (EIS) respectively at each 30 degrees interval between the θ-axis and ϕ-axis on a spherical coordinate system by controlling the location of the wireless communication device, and by carrying out the integral operation on all estimated results, TIS therefore can be obtained.

Thus, after the design of the RF circuit 10 is completed, the TRP and the TIS of the wireless communication device are estimated in the three-dimensional microwave anechoic chamber to evaluate the transmitting and receiving abilities of the wireless communication device. After that, the designers may re-adjust the RF circuit 10 according to the estimated TRP and TIS in order to obtain the highest TRP and the lowest TIS conforming to the communication specification. Such designing process, however, takes too much time and resources, and the optimal TRP and TIS may not be obtained with limited time and resource.

In order to improve the above drawback, Taiwan patent application No. 096146318 provides a method and related electronic device for adjusting an RF circuit by impedance loading features, which comprises designing a plurality of test fixtures corresponding to different impedance loading areas according to a predefined operating frequency band, coupling each of the plurality of test fixtures to a test point of the RF circuit for measuring a plurality of RF characteristic sets, and determining an optimal impedance loading area of the RF circuit according to the measured RF characteristic sets in order to adjust the RF circuit. Thus, using the method and related electronic device disclosed in the above-mentioned application, the designers can initially estimate transmitting and receiving abilities of the RF circuit without estimating TRP and TIS in the three-dimensional microwave anechoic chamber, so that time and resources for designing the RF circuit can be reduced. However, as disclosed in the Taiwan patent application No. 096146318, the plurality of test fixtures corresponding to different impedance loading areas are designed in advance, and each test fixtures is coupled to a test point of the RF circuit during testing. Such test method can initially estimate transmitting and receiving abilities, but it takes a lot of time and resources for designing and replacing the test fixtures. Therefore, the prior art cannot effectively reduce time and resources for testing the RF circuit, and thus, the application range is limited.

SUMMARY OF THE INVENTION

It is therefore a primary objective of the claimed invention to provide a test system for adjusting a wireless communication device by impedance loading features.

An embodiment of the invention discloses a test system for adjusting a wireless communication device by impedance loading features, which comprises a power supply for generating a plurality of voltages, a test fixture coupled to the power supply for generating impedances corresponding to a plurality of impedance loading areas according to the plurality of voltages generated by the power supply, a test equipment coupled to a test point of the wireless communication device via the test fixture for measuring a plurality of RF characteristic sets of the wireless communication device, and a decision device coupled to the test equipment for determining an optimal impedance loading area of the wireless communication device for adjusting the wireless communication device according to the plurality of RF characteristic sets.

These and other objectives of the invention will no doubt become obvious to those of ordinary skill in the art after reading the following detailed description of the preferred embodiment that is illustrated in the various figures and drawings.

DETAILED DESCRIPTION

In order to reduce the testing time and resources, an embodiment of the invention uses the characteristic of Positive Intrinsic Negative (PIN) diodes, to replace the plurality of test fixtures used in the prior art with a single test fixture, and complete all the tests of the impedance loading areas. As those skilled in the art recognized, there is a wide and undoped semiconductor area between a p-type semiconductor area and an n-type semiconductor area of a PIN diode, which can increase an effect of minority carrier accumulation and reverse recovery time. Therefore, the PIN diode reveals an inductive character while operating in forward bias, and reveals a capacitive character while operating in reverse bias. Using such feature, the invention can replace a plurality of test fixtures with single test fixture.

Figure 1:
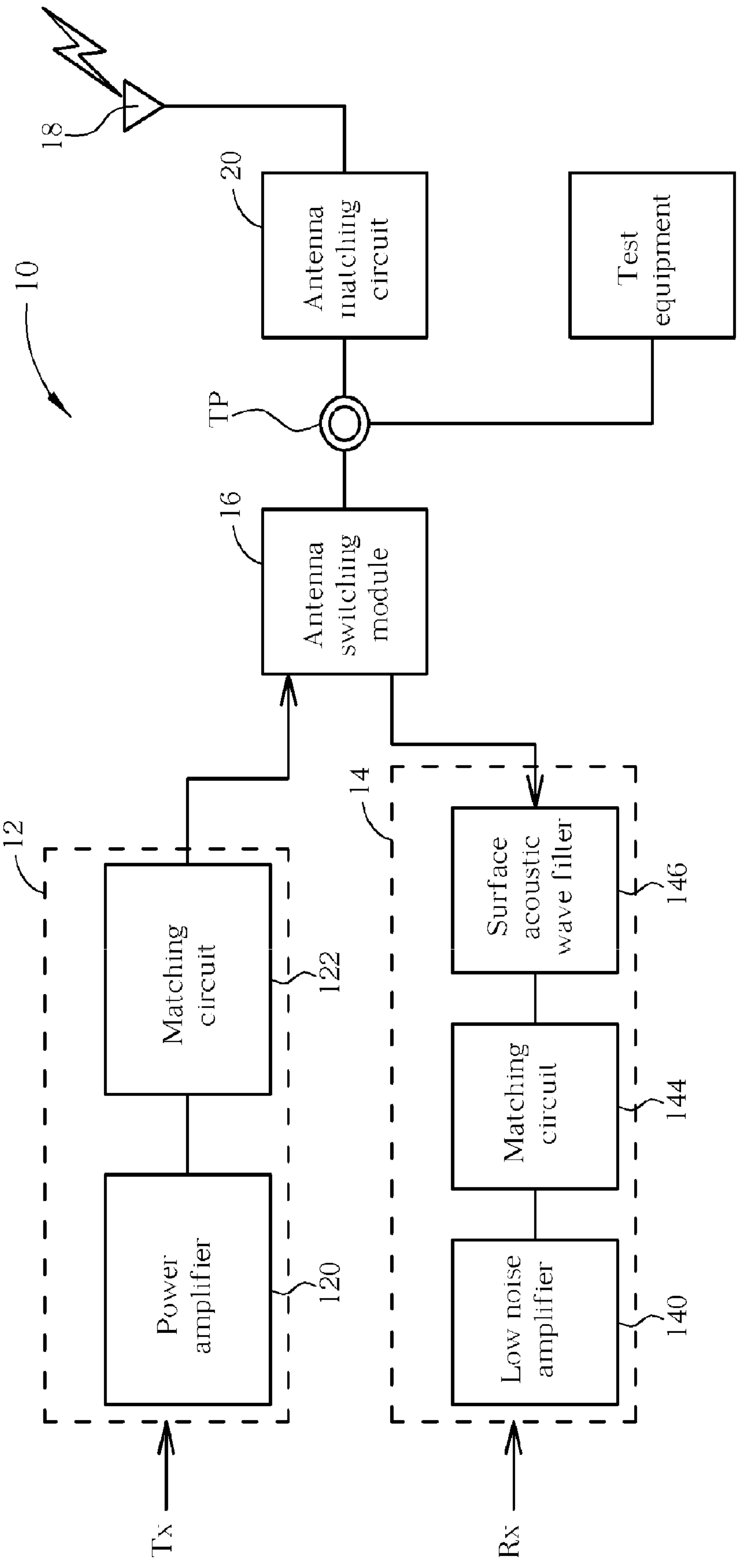
FIG. 1 PRIOR ART
FIG. 1 is a schematic diagram of an RF circuit of a wireless communication device in the prior art.
Figure 2:
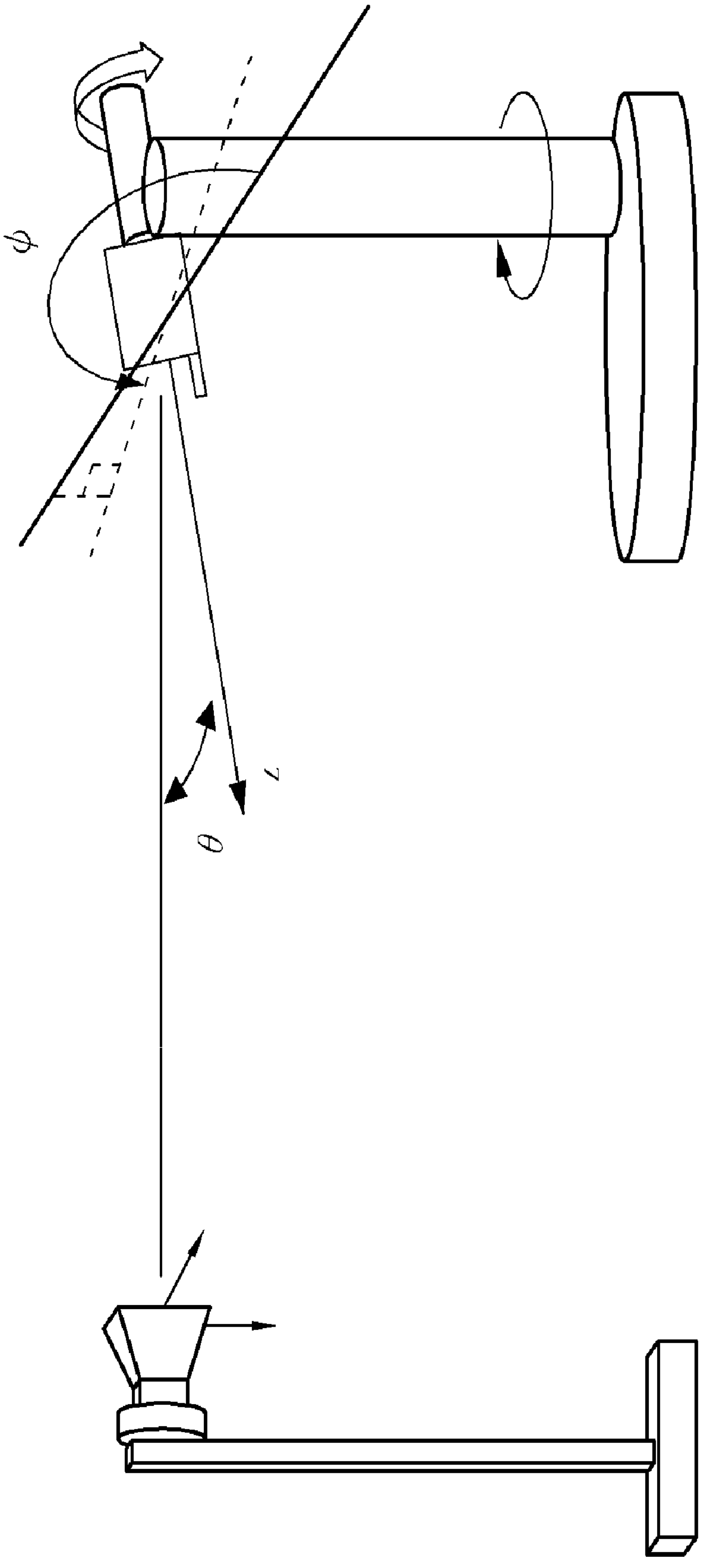
FIG. 2 PRIOR ART
FIG. 2 is a schematic diagram of testing TRP and TIS in the prior art.
Figure 3:
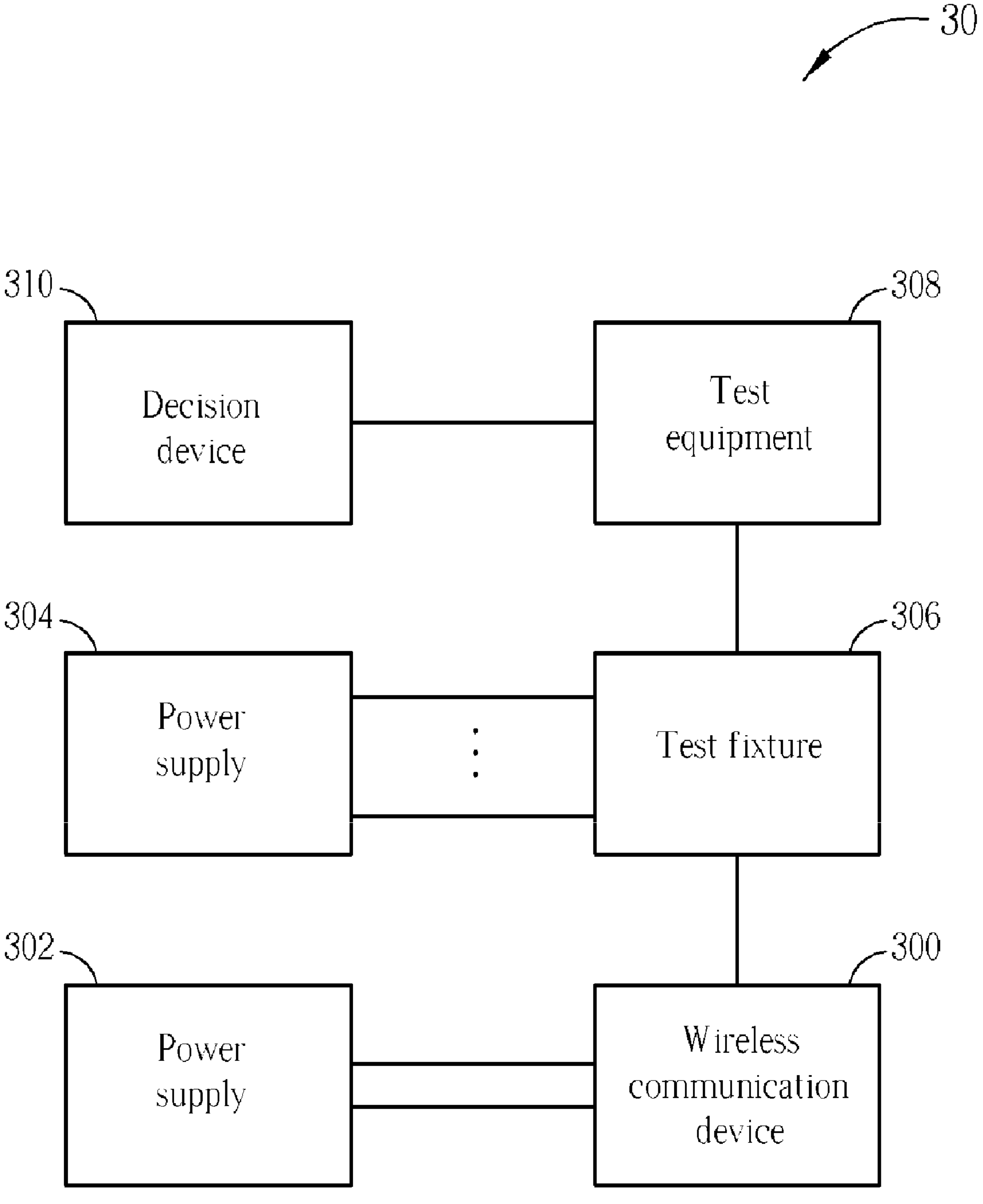
FIG. 3 is a schematic diagram of a test system according to an embodiment of the invention.

Please refer to FIG. 3. FIG. 3 is a schematic diagram of a test system 30 according to an embodiment of the invention. The test system 30 is utilized for adjusting a wireless communication device 300 by impedance loading features, and comprises power supplies 302, 304, a test fixture 306, a test equipment 308, and a decision device 310. The power supply 302 provides power for the wireless communication device 300, and the power supply 304 generates a plurality of voltages to the test fixture 306. The test fixture 306 is composed of a plurality of PIN diodes, and utilized for generating impedances corresponding to a plurality of impedance loading areas according to the plurality of voltages generated by the power supply 304. Preferably, the test equipment 308 comprises a composite analyzer and a network analyzer with 50Ω impedance. The test equipment 308 is coupled to a test point (not shown in FIG. 3) of the wireless communication device 300 via the test fixture 306, and utilized for measuring a plurality of RF characteristic sets of the wireless communication device 300 via the test fixture 306. The decision device 310 is utilized for determining an optimal impedance loading area of the wireless communication device 300 for adjusting the wireless communication device 300 according to the RF characteristic sets measured by the test equipment 308.

Figure 4:
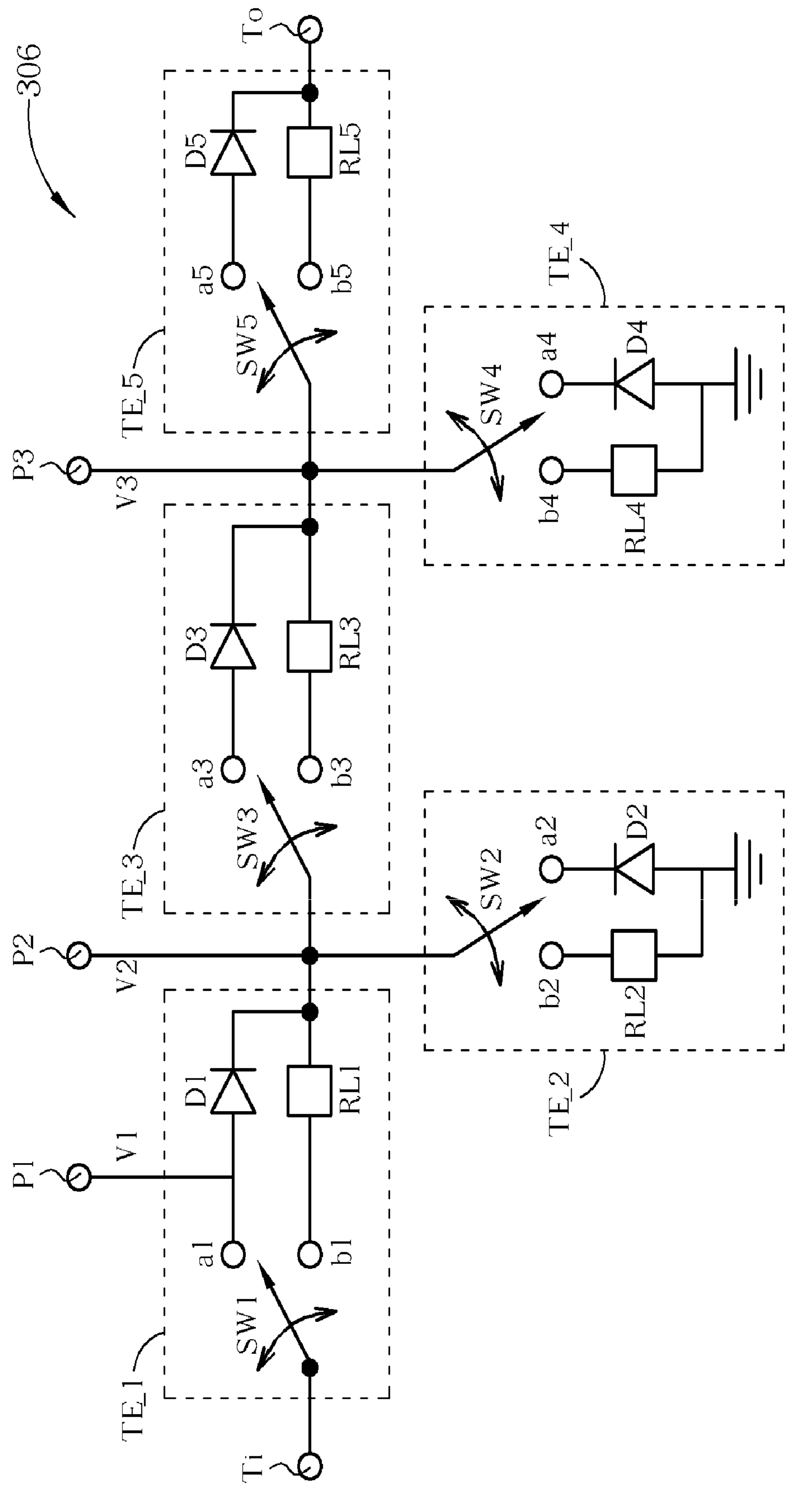
FIG. 4 is a schematic diagram of a five-order test fixture according to an embodiment of the invention.

In the test system 30, the test fixture 306 generates impedances corresponding to different impedance loading areas by the characteristic of the PIN diode. Thus, by adjusting output voltages of the power supply 304, the required impedances can be generated. Take a five-order test fixture 306 for example. Please refer to FIG. 4, which illustrates a schematic diagram of the five-order test fixture 306 according to an embodiment of the invention. In FIG. 4, the test fixture 306 comprises an input terminal Ti, an output terminal To, power terminals P1, P2, P3, and impedance units TE_1, TE_2, TE_3, TE_4, TE_5. The input terminal Ti is coupled to the test point of the wireless communication device 300. The output terminal To is coupled to the test equipment 308. The power terminals P1, P2, P3 are utilized for receiving the voltages V1, V2, V3 generated by the power supply 304. Each of the impedance units TE_1, TE_2, TE_3, TE_4, TE_5 is composed of a PIN diode (i.e. D1, D2, D3, D4, D5), a switch (i.e. SW1, SW2, SW3, SW4, SW5), and a resistor or inductor (i.e. RL1, RL2, RL3, RL4, RL5), to generate the required impedances by adjusting the PIN diode and the resistor or inductor according to impedance corresponding to a specific impedance loading area. Moreover, the test fixture 306 can comprise regulated grounding capacitors (not shown in FIG. 4) and RF chocks (not shown in FIG. 4) coupled to the power terminals P1, P2, P3, and the impedance units TE_1, TE_2, TE_3, TE_4, TE_5, to regulate power generated by power supply 304.

Figure 5:
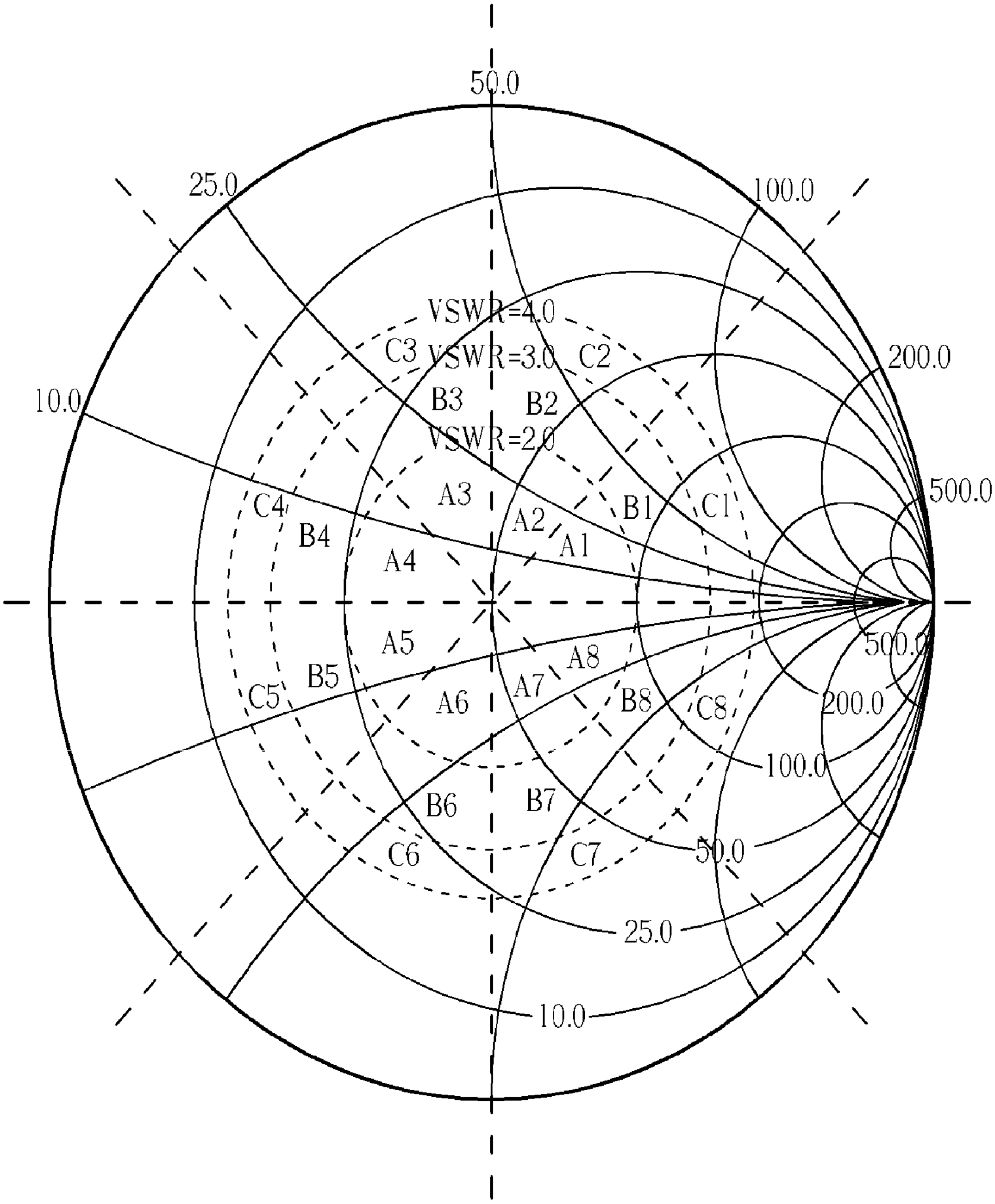
FIG. 5 is a schematic diagram of an impedance loading partition according to an embodiment of the invention.

Using the test fixture 306 shown in FIG. 4 when testing the wireless communication device 300, the invention can adjust the voltages V1, V2, V3, the switches SW1, SW2, SW3, SW4, SW5, and the resistors (or inductors) RL1, RL2, RL3, RL4, RL5 according to required impedance matching and voltage standing wave ratios (VSWRs), to generate the required impedance feature for the test equipment 308, so that the test equipment 308 can measure transmitting power, receiving sensitivity, and power consumption under a specified impedance loading area. First, please refer to FIG. 5, which is a schematic diagram of an impedance loading partition according to an embodiment of the invention. In FIG. 5, according to a predefined frequency band, a Smith Chart is separated into 24 areas A1~A8, B1~B8, and C1~C8 according to eight parts and circles of VSWR=2, 3, and 4. Then, the switches SW1~SW5, and the resistors (or inductors) RL1~RL5 are adjusted according to each impedance loading area. For example, to simulate impedance loading of an antenna in the area A4, the voltages V1, V2, V3, the switches SW1~SW5, and the resistors (or inductors) RL1~RL5 can be adjusted as follows:

(1) Set the switch SW1 to be coupled to a point b1, the resistor RL1 to be 0Ω and the voltage V1 to be 0V (volt).

(2) Set the switch SW2 to be coupled to a point a2, and the voltage V2 to be 2.5V. Thus, the PIN diode D2 operates in 2.5V reverse bias, and can generate 1.09 picofarad (pF).

(3) Set the switch SW3 to be coupled to a point a3, and the voltage V3 to be 0.5V. Thus, the PIN diode D3 operates in forward bias, and can generate 1.5 nano-Henry (nH).

(4) Set the switch SW4 to be coupled to a point a4. Thus, the PIN diode D4 operates in 0.5V reverse bias, and can generate 1.89 PF.

(5) Set the switch SW5 to be coupled to a point b5 and the resistor RL5 to be 0Ω.

Figure 6:
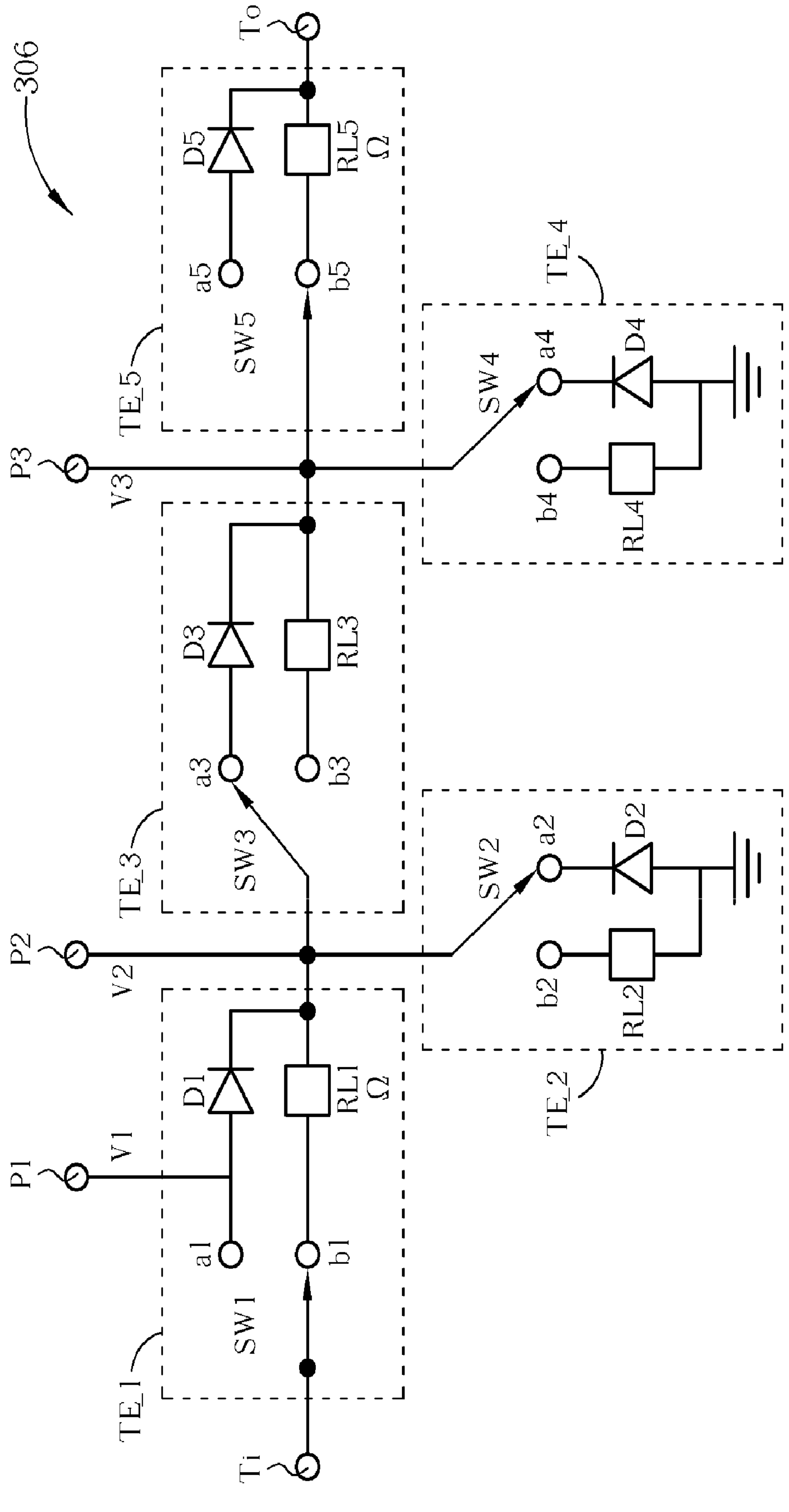
FIG. 6 is a schematic diagram of a component connecting method for the test fixture shown in FIG. 4 according to the impedance loading partition shown in FIG. 5.

After adjusting the switches SW1, SW2, SW3, SW4, SW5, and the resistors RL1, RL2, RL3, RL4, RL5 by the above-mentioned steps, connections of the components in the test fixture 306 are as shown in FIG. 6. Then, the test fixture 306 is applied in the test system 30, to measure transmitting power, receiving sensitivity, and power consumption corresponding to the loading impedance of the area A4 in FIG. 5 with the test equipment 308. By the same token, the transmitting power, receiving sensitivity, and power consumption corresponding to the loading impedance of other areas shown in FIG. 5 can be measured. Finally, the decision device 310 compares the transmitting power, receiving sensitivity, and power consumption of loading impedance of each area of A1~A8, B1~B8, C1~C8, to determine the optimal impedance loading area accordingly. Therefore, when designing an antenna and a corresponding antenna matching circuit, the designer can design impedance loading of the antenna in the optimal impedance loading area to achieve the optimal design of TRP, TIS and power consumption.

In the prior art, a designer must design the test fixtures corresponding to different impedance loading areas in advance, and couple each test fixture to a test point of an RF circuit during test, which wastes time and resources. In comparison, the invention replaces the test fixtures with a single test fixture according to the characteristic of the PIN diode, i.e. the PIN diode reveals an inductive character while operating in forward bias and reveals a capacitive character while operating in reverse bias. As a result, the invention can obtain the impedances corresponding to different impedance loading areas by adjusting voltages outputted to the text fixture and connections of each element thereof, to decrease time and resources for performing test.

In conclusion, the invention utilizes the characteristic of the PIN diode to generate impedance features corresponding to different impedance loading areas with single test fixture, to replace a plurality of test fixtures, and decrease time and resources for performing test. Thus, before entering the three-dimensional microwave anechoic chamber to estimate TRP and TIS, the designer can initially estimate the transmitting and receiving abilities of the RF circuit, and adjust the RF circuit accordingly, so as to reduce time and resources for designing the wireless communication device.

Those skilled in the art will readily observe that numerous modifications and alterations of the device and method may be made while retaining the teachings of the invention.

What is claimed is:

1. A test system for adjusting a wireless communication device by impedance loading features comprising:

a power supply for generating a plurality of voltages;

a test fixture coupled to the power supply for generating impedances corresponding to a plurality of impedance loading areas according to the plurality of voltages generated by the power supply;

a test equipment coupled to a test point of the wireless communication device via the test fixture for measuring a plurality of radio frequency characteristic sets of the wireless communication device; and a decision device coupled to the test equipment for determining an optimal impedance loading area of the wireless communication device for adjusting the wireless communication device according to the plurality of radio frequency characteristic sets.

2. The test system of claim 1, wherein the test fixture is designed according to impedance matching and voltage standing wave ratios (VSWR) corresponding to the plurality of impedance loading areas.

3. The test system of claim 2, wherein the test fixture comprises:

an input terminal coupled to the test point of the wireless communication device;

an output terminal coupled to the test equipment;

a plurality of power terminals coupled to the power supply for receiving the plurality of voltages; and a plurality of impedance units coupled to the input terminal, the output terminal, and the plurality of power terminals, each of the plurality of impedance unit generating a specific impedance according to a received voltage.

4. The test system of claim 3, wherein each of the plurality of impedance units comprises a Positive Intrinsic Negative diode.

5. The test system of claim 4, wherein the Positive Intrinsic Negative diode reveals an inductive character while operating in forward bias and reveals a capacitive character while operating in reverse bias.

6. The test system of claim 4, wherein each of the plurality of impedance units further comprises a passive component coupled to the Positive Intrinsic Negative diode in parallel.

7. The test system of claim 6, wherein the passive component is a resistor or an inductor.

8. The test system of claim 6, wherein each of the plurality of impedance units further comprises a switch coupled to the Positive Intrinsic Negative diode and the resistor for controlling a connection between the Positive Intrinsic Negative diode and the passive component.

9. The test system of claim 8, wherein the switch controls a connection between the Positive Intrinsic Negative diode and the passive component according to impedances corresponding to the plurality of impedance loading areas.

10. The test system of claim 3, wherein the test fixture further comprises a plurality of radio-frequency chocks coupled between the plurality of power terminals and the plurality of impedance units.

11. The test system of claim 1, wherein the plurality of impedance loading areas are generated according to a predefined operating frequency band corresponding to the wireless communication device.

12. The test system of claim 1, wherein each of the plurality of radio frequency characteristic sets comprises characteristics of transmitting power, receiving sensitivity, and power consumption.

13. The test system of claim 1, wherein impedance of the test equipment is 50Ω.

14. The test system of claim 13, wherein the test equipment comprises a composite analyzer and a network analyzer.

15. The test system of claim 1, wherein the decision device is utilized for selecting an optimal radio frequency characteristic from the plurality of radio frequency characteristic sets, and determining the optimal impedance loading area of the wireless communication device according to the impedance feature of the test fixture corresponding to the optimal radio frequency characteristic.

16. The test system of claim 1, wherein the decision device is utilized for providing a basis for adjusting an antenna and an antenna matching circuit of the wireless communication device.

* * * * *